July 7, 1959 R. P. MORK 2,894,254

CONVERSION OF BINARY CODED INFORMATION TO PULSE PATTERN FORM

Filed Dec. 10, 1953 2 Sheets-Sheet 1

INVENTOR
RAYMOND P. MORK
BY Elmer J. Gorn
ATTORNEY

July 7, 1959 R. P. MORK 2,894,254

CONVERSION OF BINARY CODED INFORMATION TO PULSE PATTERN FORM

Filed Dec. 10, 1953 2 Sheets-Sheet 2

INVENTOR
RAYMOND P. MORK
BY [signature]
ATTORNEY

United States Patent Office 2,894,254

Patented July 7, 1959

2,894,254

CONVERSION OF BINARY CODED INFORMATION TO PULSE PATTERN FORM

Raymond P. Mork, Needham Heights, Mass., assignor to Raytheon Company, a corporation of Delaware Application December 10, 1953, Serial No. 397,292

6 Claims. (Cl. 340—347)

This invention relates to coded information, and particularly to the conversion of binary-coded numbers to pulse-position or pulse-time intelligence.

In one of its aspects the invention resides in dividing the component digits of a binary-coded number into a plurality of groups of progressively increasing fineness, separately identifying each of the groups, and integrating the separate identifications to obtain a signal corresponding to the coded number.

In another of its aspects the invention involves directing electrical current representing a coded number along a selected channel constituting part of a multi-channeled path, while concurrently directing an identifying pulse toward each of the channels of said path, for arrival at each successive channel in known time sequence, the pulse being eventually allocated to and passed through a particular channel that is made available to it by the action of said number-representing current. This available channel will be the particular one associated with the number to be decoded; therefore, the pulse passing through said channel will serve to identify such number.

Other features and characteristics of the invention will become apparent upon reference to the following description and the illustration thereof in the accompanying drawings wherein.

Figure 1:
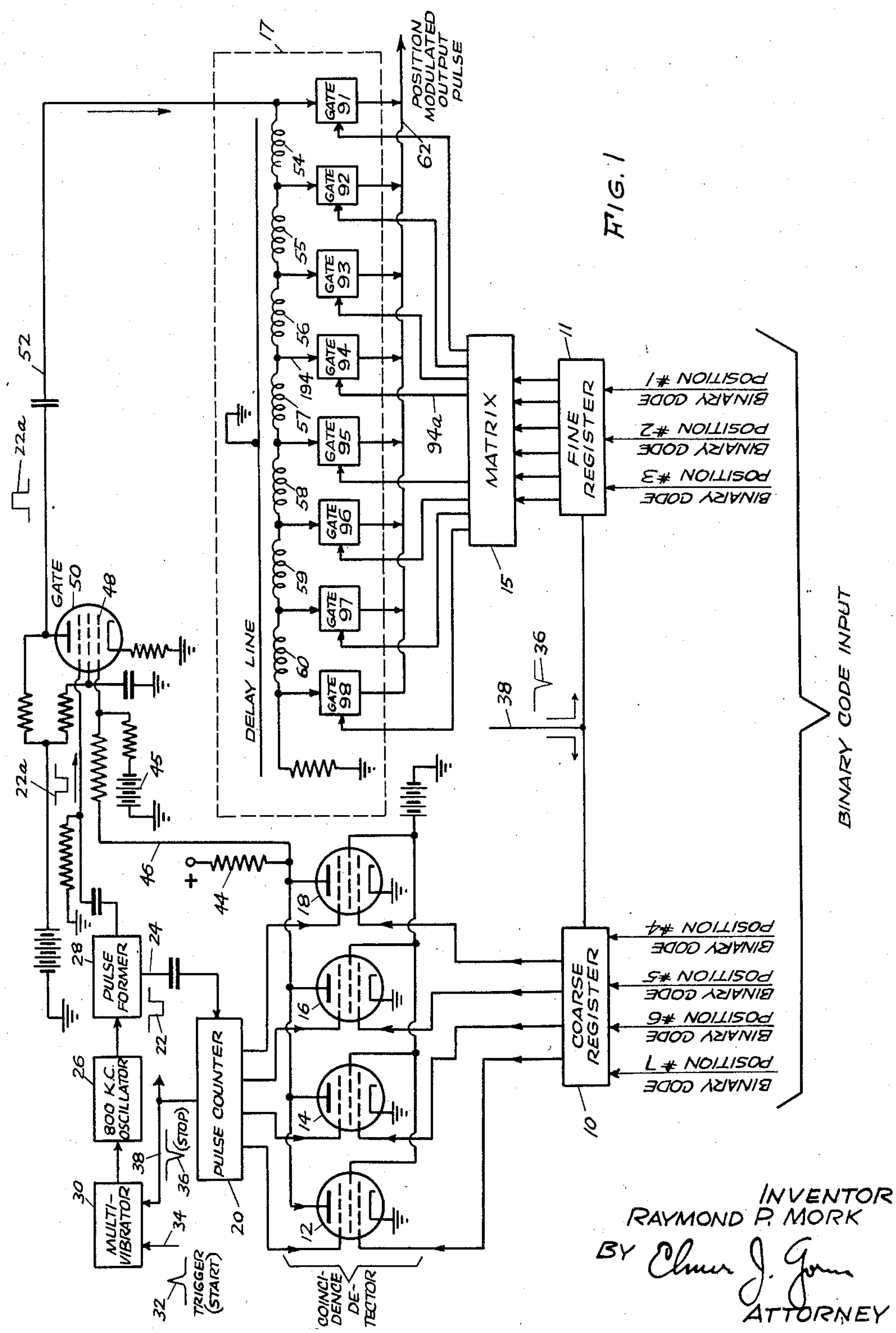
Fig. 1 is a schematic diagram of one embodiment of the invention.

Referring first to Fig. 1, the illustrated embodiment is there shown as including two holding registers 10 and 11 designated as "Coarse register" and "Fine register," respectively, and together constituting means for registering binary code numbers having seven binary code digits, of which the four digits of coarser character, that is, the digits whose values change less frequently, are registered in unit 10, while the three finer digits (susceptible of more frequent change) are registered in unit 11. The details of the registering circuits of unit 10 are similar to those for unit 11, the latter being indicated in Fig. 2 as constituted by suitable bistable multi-vibrators adapted to alternate between conductive and nonconductive conditions, in response to the impressment thereon of binary digital values which likewise alternate between the "1" and "0" denominations, as they successively represent varying numerical equivalents of the decimal system, in accordance with the conventional conversion plan. In the conventional plan the decimal system number 19, for example, is represented in the binary system by seven binary digits arranged in the following order:

(No. 19) - - - 0 0 1 0 0 1 1 of which the four digits on the left side (that is, the digits 0 0 1 0) are in the category of "coarse" digits, as that term is used herein; the remaining three digits—these latter being digits which normally fluctuate more rapidly between the "1" and "0" denominations—being in the category of "fine" digits. Thus in passing from a registry of the decimal number 19 to decimal number 20, the register would change its setting as follows:

(No. 19) - - - 0 0 1 0 0 1 1
(No. 20) - - - 0 0 1 0 1 0 0

From this example it will be noted that such a change effects only the three "Fine register" digits on the right, the four "Coarse register" digits remaining unchanged. This is typical of the majority of the computations in binary code, and the same contrast between coarse and fine digits will obtain in any binary arrangement, whether the number of digits be greater or less than the seven herein represented by way of example. It should be further noted that the individual digits or both the coarse and fine groups are themselves of progressively increasing degrees of fineness (from left to right, as above set down) and because of this property of progressive variation in the degree of fineness, it is, of course, possible to segregate the digits into three, four, or more groups in lieu of the two groups herein illustrated. Also, it is to be understood that the digits may be arranged with their order of fineness increasing from right to left, rather than left to right the physical positioning being variable at will, from installation to installation, so long as the applicable binary conversion code is adhered to in operation of a given individual installation.

In the illustrated embodiment, the digits registered in the coarse unit 10 are subjected to an identifying process different from that applied to the digits registered in the fine unit 11. Accordingly, the description immediately following applies only to the coarse digital group. The operations affecting the fine digital group are described at a subsequent point of the specification.

Dual control grid tubes 12, 14, 16, and 18 (Fig. 1) constitute what may be termed a coincidence detector. The lower control grids of these tubes connect electrically with the four multivibrator sets of register 10, so that each tube is alternately conductive (or conditioned for conductivity) and nonconductive, according to whether its associated multivibrator in register 10 is conductive or nonconductive, and this, in turn, depends upon whether the latter elements are registering "1" or "0" digital values at the moment under consideration.

The upper control grids of tubes 12, 14, 16, and 18 connect electrically with associated operating units of a counting mechanism 20, which may be of a known type comprising four sets of bistable multivibrators connected together to count pulses 22 in line 24 leading from an oscillator 26 and pulse former 28. The oscillator is shown as being under the control of another bistable multivibrator 30, so that when a synchronizing pulse 32 occurs in line 34, the multivibrator 30 causes oscillator 26 to generate a fixed frequency signal which is formed into pulses 22 by the pulse-former 28. Such signal containues at the selected frequency (800 kc. as assumed) until stopped by a pulse 36 supplied over line 38 in a manner hereinafter described. It will be observed that a relatively low frequency rate of 800 kc. is suggested as the transmission rate for pulses 22, this being only one-eighth of the 6.4 megacycle frequency commonly required for a 128 cycle code of the seven digit binary type herein illustrated. The possibility of operating at this relatively low frequency constitutes one of the major advantages of the present invention, and coincidentally eliminates a source of trouble inherent in operation at multimegacycle frequencies. The manner in which the present invention makes it feasible to operate at this lower frequency level will become better understood as the description progresses.

The multivibrators of counter 20 identify the number entered in register 10 by running through a sufficient number of cycles, as regulated by the action of oscillator 26, to produce coincidence of control impulses as between the upper and lower control grids of the dual control detector tubes 12, 14, 16, and 18, whereupon all four tubes become nonconducting. When this occurs, the potential relationship is such that source 44 may now overcome the nonconducting bias applied to gating tube 50 by way of source 45, and send triggering energy along line 46 to lower control grid 48 of said gating tube 50 whose upper control grid is in a direct circuit from oscillator 26 and pulse-former 28.

Following this triggering of gate tube 50, the next formed pulse emitted from oscillator 26 will pass through gating tube 50 to the delay line conductor 52, thence through the successive delay line sections 54 through 60, or so many of them as is necessary in order to reach a point of egress permitting passage of the pulse to the output circuit 62 leading to the decoding station (not shown) where the pulse will produce an indication (by position or time modulation) representative of the sum of the two time intervals involved in its generation and delivery, namely: (1) the time interval running from the start of oscillations at oscillator 26 to the occurrence of coincidence at the detectors 12 through 18, and (2) the time interval consumed in passage of the gated pulse 22*a* from tube 50 through one or more sections of the delay line, in order to reach output line 62. This time interval summation will be of a magnitude which varies in correspondence to variations in the numbers represented in binary digital form on the registers 10 and 11. It will be observed that, since detectors 12 through 18 receive coincidence actuation from only the coarser digital registering means, the time consumed in running to coincidence with the pulses from the pulse counter will be relatively short as contrasted with prior systems, which attempted to establish coincidence throughout the complete digital chain. Hence there is no need to resort to pulse-sending frequencies of such high orders as to multiply the chances of error by reason of correspondingly increasing the difficulties of maintaining synchronism between the pulse-counting and digit-transmitting operations. Thus the division of the digit-registering function between two or more units tends to greater accuracy in the result.

There has been explained above the manner in which register 10 (in conjunction with coincidence detectors 12–18) determines the time interval for identification of that portion of a number which is assigned to said register 10; there will now be described the manner in which the remaining portion of the number, as applied to register 11, determines the time interval for passage of the gated pulse 22*a* along the delay line to output line 62, and thereby identifies itself.

Register 11 includes, in the assumed embodiment of the invention, three sets of multivibrator circuits (see Fig. 2) each having a pair of triodes representing one of the three digits of that portion of the seven-digit binary code which has been assigned to register 11; the triodes 70 and 71 being operated by a negative trigger pulse traversing line 80 and representing the first ("finest") of the three binary digits, the triodes 72 and 73 being operated by the second digit-applying line 81, and the triodes 74 and 75 by the third digit-applying line 82.

A diode matrix unit 15 consists of a network of diodes (crystalline or tubular) arranged in intersecting current flow paths (Fig. 2) leading from a positive potential source 100 to the respective multivibrator tubes 70 through 75, and also leading to a series of gating tubes 91 through 98, to activate selected control grids thereof, the said tubes being in circuit with successive sections of the delay line 54–60, as shown in Fig. 1. The arrangement is such that all multivibrator tubes that are in the conductive state, at any given instant, operate to draw current through the various diode circuits 91*a* and 98*a*, inclusive, leading thereto, and in doing so they cause the potential of said circuits to drop below the operating value of the gating tube grids connected to said circuits. At any given point in the operation, such potential drop will affect all except one of the gate-operating circuits 91*a* through 98*a*, the one not affected thereupon functioning to open the gating tube associated therewith, to allow the heretofore described pulse 22*a* to emerge therethrough. A typical action will now be traced.

If it be assumed that the decimal number 20 is to be entered in binary code (0 0 1 0 1 0 0) on the seven digits of registers 10 and 11, the portion of the code assigned to register 11, namely, the three right-hand digits – – – 1 – – 0 – – 0, would be entered thereon by application of a trigger pulse 90 to the "1" registering line 82 only, the lines 81 and 80 being excluded from receipt of this particular pulse as they are to register "0" rather than "1." Accordingly, only the tube 75 is triggered to become nonconductive, the tubes 73 and 71 remaining in their normal conductive state, that is, the state to which they are biased at the conclusion of each number-converting cycle, by the action of "clearing" pulse 36 sent out from counter 20 and operative to reset the registers 10 and 11 while concurrently triggering multivibrator 30 to the pulse-stopping position. The anode of tube 75, because of its conversion to the nonconductive state, will undergo a rise in potential, and this, in turn, will raise the grid potential of tube 74 to the point of producing a conductive condition in said tube 74, as indicated by the lack of shading on tube 74 in Fig. 2 where tube 75 appears shaded, to signify the nonconductive state.

This state of conduction in tube 74 will cause a drop in potential at its anode, which drop reduces the grid potential of tube 75. As a result, tube 75 remains nonconductive, while tube 74 remains conductive. Concurrently, as tubes 73 and 71 are still in their normal conductive state, and tubes 72 and 70 in their normal nonconductive state (there being an absence of a triggering pulse in lines 81 and 80), a current flow path is established to gating tube 94 by way of line 94*a* and circumventing diodes 89*d*, 86*b*, and 84*b*, this being the only current flow path of sufficiently high potential from source 100, in that it is the only path completely free of current-diverting conductive diodes—there being (under the assumed conditions) at least one conductive diode in every other path in the diode matrix shown schematically in Fig. 2. Accordingly, all horizontal flow paths of the matrix (except path 94*a*) undergo a potential drop rendering them too weak to produce sufficient potential change in the grid circuits of their respective gating tubes. Hence only gating tube 94 is triggered to the conducting state, and the heretofore described pulse 22*a*—following its passage through gate 50—is now free to emerge from the delay line by way of tap-off 194 leading to gate 94, as indicated in Fig. 1. The time interval required for passage of this pulse through delay line sections 54, 55, and 56 is, therefore, the measure representing the binary component – – – 1 – – 0 – – 0 herein assumed as the factor to be identified (at the instant under consideration) by the conjoint action of the matrix and gating units 15 and 17, respectively.

Figure 2:
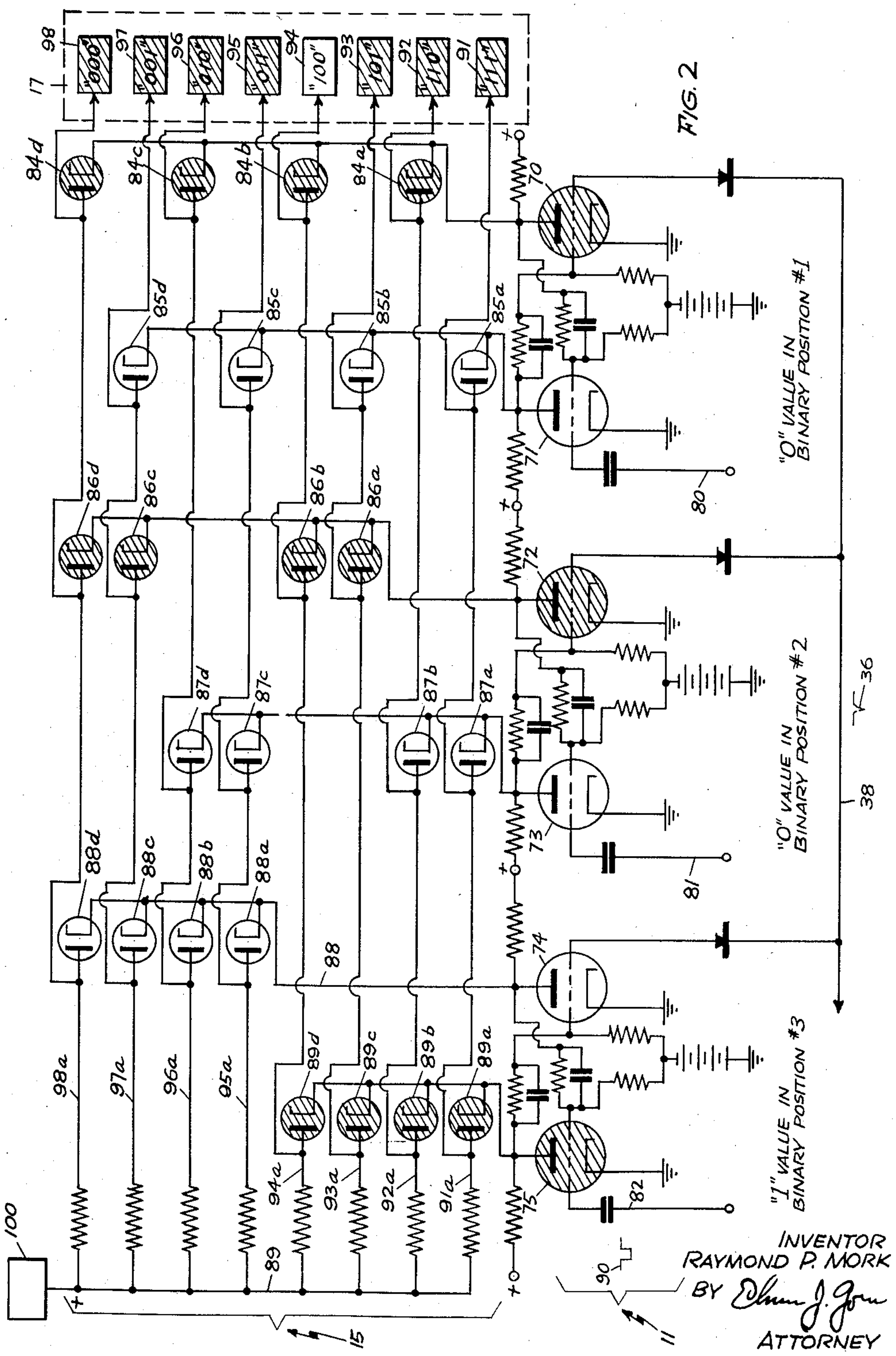
Fig. 2 shows the electrical connections for the "Fine register" units and the matrix components indicated in block form in Fig. 1.

In the operation of these pulse allocation and identification units 15 and 17, it will be noted there is no employment of multi-megacycle counting, or coincidence detection of "fine" (rapidly changing) digits through dual control grid tubes, such as the tubes 12–18 associated with the "coarse" counting phase of the operation. In other words, the factors that normally introduce a time-consuming problem are eliminated. As a result, there is virtually no limit to the speed of pulse propagation that can be employed. Because of this freedom from pulse frequency limitations, the matrix-gating method of decoding, as illustrated in Fig. 2, may be selected for application to all digits of the binary code instead of merely to the finer digits, as in the illustrated embodiment.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a system for converting binary digital numbers to pulse-derived intelligence, means including a plurality of registers for conjointly holding separate groups of digits of a coded digital number, means electrically connected to a first of said registers and operative to identify a first separate group of digits of said binary number as held on said first register before any identification of a second separate group of digits held on a second of said registers occurs, gating means responsive to operation of said identifying means and operative to pass a signal pulse representing the identified first group of digits, and means responsive to said second group of digits as held on said second register and operative to indicate said second group of digits of said number as well as the digits of said first group previously identified.

2. In a system for converting binary digital numbers to a pulse pattern of corresponding significance, means operative to identify the digits constituting a first separate portion of a coded number before any identification of the digits constituting a second portion of said coded number occurs, gating means responsive to the operation of said identifying means and operative to transmit a pulse representing said first portion of said coded number, and means acting upon said transmitted pulse whereby said transmitted pulse represents a second portion of said coded number in proper apposition to said first portion.

3. In a system for handling associated binary digits representing a decimal number in binary code, means including separate coarse and fine registers for receiving and holding actuating pulses representative of separate coarse and fine groups of digits of said coded number, means for transmitting a pulse in a time sequence determined by the digits held on said coarse register after said digits on said coarse register have been identified, and means for delaying delivery of said transmitted pulse to an output point to an extent determined by the digits held on said fine register.

4. In a system for handling associated binary digits of a binary number which are progressively coarser when read in one order of association, and progressively finer when read in the opposite order of association, for representation of a decimal number in binary code, means including a pulse counter for receiving actuating pulses at regularly recurring intervals, a plurality of coincidence detectors operative to prevent reception of one of said pulses by said pulse counter when the count on said pulse counter identifies the coarser digits of said number held on coarse digit registering means, and means for controlling the time passage of said pulse to an output point in accordance with the represented value of the finer digits of said number held on fine digit registering means.

5. In a system for handling associated binary digits which are progressively coarser when read in one order of association, and progressively finer when read in the opposite order of association, for representation of a decimal number in binary code, means including a pulse counter for receiving actuating pulses at regularly recurring intervals, means for holding the coarser digits of said number, means for identifying the coarser digits held on said holding means, means for transmitting an identifying pulse representative of the digits held on said coarse digit holding means after identification of said coarse digits, means including a series of pulse gates for controlling the path followed by said identifying pulse in accordance with the value of the fine digits held on a fine digit register, and means for opening a particular one of said pulse gates, said opening means comprising a circuit controlled by a value of said fine digits.

6. In a system for handling associated binary digits which are progressively coarser when read in one order of association, and progressively finer when read in the opposite order of association, for representation of a decimal number in binary code, means including a pulse counter for receiving actuating pulses at regularly recurring intervals, means for holding the coarser digits of said number, means for identifying the coarser digits held on said holding means, means for transmitting an identifying pulse representative of the digits held on said coarse digit holding means after identification of said coarse digits, means including a series of pulse gates for controlling the path followed by said identifying pulse in accordance with the value of the fine digits held on a fine digit register, and means for opening a particular one of said pulse gates, said opening means comprising electronic tubes arranged in a pattern conforming to the finer digits of said number.

References Cited in the file of this patent

UNITED STATES PATENTS

| | | |
|---|---|---|
| 2,449,819 | Purington | Sept. 21, 1948 |
| 2,485,821 | Gloess | Oct. 25, 1949 |
| 2,498,678 | Grieg | Feb. 28, 1950 |
| 2,567,203 | Golay | Sept. 11, 1951 |
| 2,616,965 | Hoeppner | Nov. 4, 1952 |
| 2,641,698 | Gloess | June 9, 1953 |
| 2,662,116 | Potier | Dec. 8, 1953 |
| 2,676,316 | Wallace | Apr. 20, 1954 |
| 2,678,350 | Eaglesfield | May 11, 1954 |